(12) United States Patent
Yuan (10) Patent No.: US 7,729,059 B2
(45) Date of Patent: Jun. 1, 2010

(54) CAMERA DEVICE

(75) Inventor: Kun-I Yuan, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 106 days.

(21) Appl. No.: 11/737,937

(22) Filed: Apr. 20, 2007

(65) Prior Publication Data

US 2008/0117530 A1  May 22, 2008

(30) Foreign Application Priority Data

Nov. 22, 2006  (CN) .................. 2006 1 0157002

(51) Int. Cl.
*G02B 15/14* (2006.01)
(52) U.S. Cl. ..................... 359/694; 359/696
(58) Field of Classification Search .......... 359/696, 359/821–824, 694; 348/345, 376; 396/79, 396/85; 353/101
See application file for complete search history.

(56) References Cited

U.S. PATENT DOCUMENTS 4,055,761 A * 10/1977 Shimomura ............... 250/239
6,483,101 B1 * 11/2002 Webster ..................... 250/216
7,059,040 B1 * 6/2006 Webster et al. ............. 29/831

FOREIGN PATENT DOCUMENTS

CN  2665733 Y  12/2004

\* cited by examiner

*Primary Examiner*—Joseph Martinez
(74) *Attorney, Agent, or Firm*—Jeffrey T. Knapp (57) ABSTRACT

An exemplary camera device includes a holder, an image sensor, an outer barrel with an axis, an inner barrel unit. The image sensor is disposed in the holder. The inner barrel unit includes an inner barrel and at least one lens disposed in the inner barrel. The inner barrel is threadedly received in the outer barrel. The holder includes a first ring-shaped part, and the outer barrel includes a second ring-shaped part. The first ring-shaped part is coupled to the second ring-shaped part.

2 Claims, 11 Drawing Sheets

CAMERA DEVICE

BACKGROUND

1. Technical Field

The present invention relates generally to optical imaging, and more particularly to a camera device and a method for making the camera device.

2. Description of Related Art

With the development of the optical imaging technology, camera devices are widely used in electronic devices, such as digital cameras and mobile phones.

Figure 10:
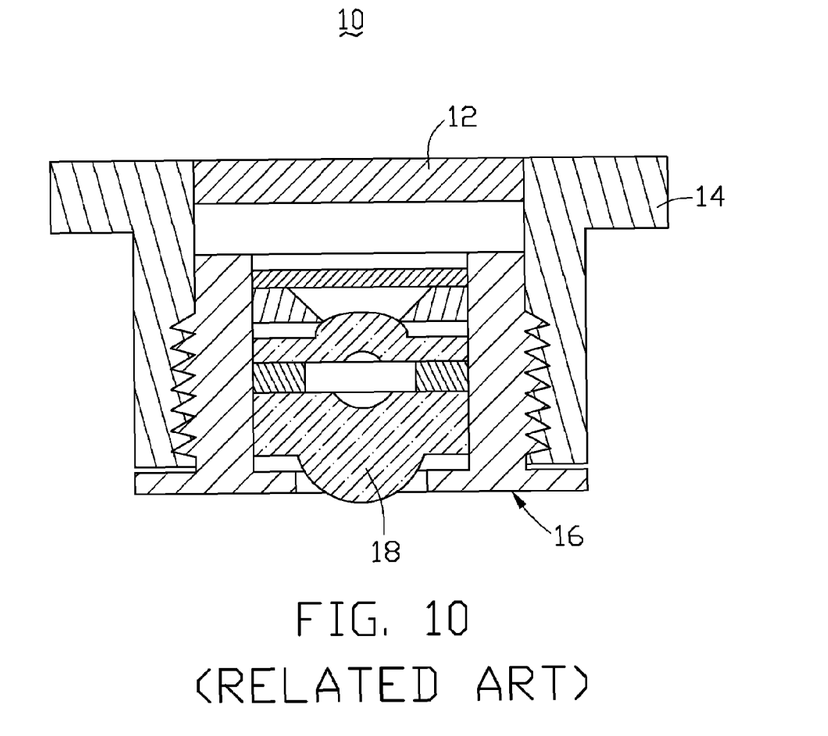
FIG. 10 is a schematic, side cross-sectional view of a conventional camera device.

Generally, a camera device 10 includes an image sensor 12, a barrel unit 16, and a holder 14, referring to FIG. 10. The image sensor 12 is received in the holder 14. The barrel unit 16 is threadedly coupled to the holder 14, and includes a plurality of optical elements (e.g., a lens 18) disposed therein. The barrel unit 16 is configured for forming an image 11. A distance between the image sensor 12 and the barrel unit 16 is adjusted by rotating the barrel unit 16, thus achieving the best imaging quality of the camera device 10.

Figure 11:
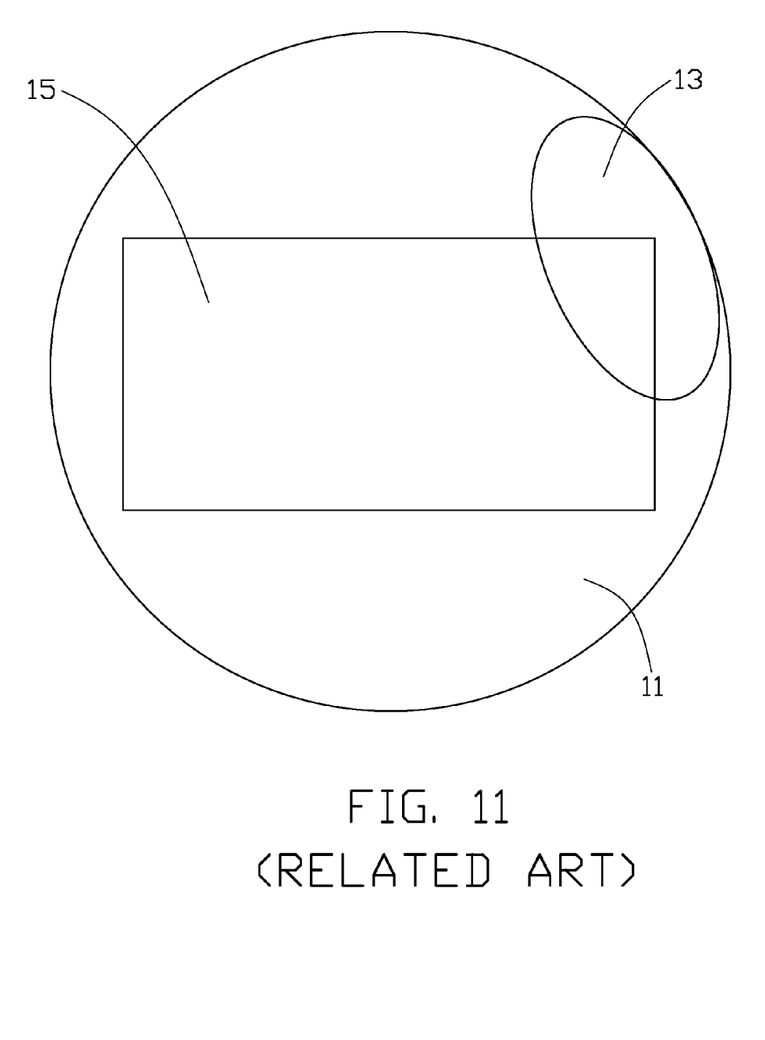
FIG. 11 is a schematic, plan view of imaging state of the camera device of FIG. 10.

Occasionally, the image 11 includes some defective image areas 13 when the optical elements are inaccurately produced or inappropriately assembled into the barrel unit 16, referring to FIG. 11. When the defective imaging quality area 13 overlaps a detecting area 15 of the image sensor 12, imaging quality of the camera device 10 is decreased. Therefore, such a camera device 10 is unsatisfactory.

It is therefore desirable to find a new camera device and a new method capable of overcoming the above mentioned problems.

SUMMARY

An exemplary half-finished camera device includes a holder, an image sensor, an outer barrel with an axis, and an inner barrel unit. The image sensor disposed in the holder. The inner barrel unit includes an inner barrel and at least one lens disposed in the inner barrel. The inner barrel is threadedly received in the outer barrel. The outer barrel is rotatably coupled to the holder.

An exemplary camera device includes a holder, an image sensor, an outer barrel, and an inner barrel unit. The image sensor is disposed in the holder. The inner barrel unit includes an inner barrel and at least one lens disposed in the inner barrel. The inner barrel is threadedly received in the outer barrel. The holder includes a first ring-shaped part, and the outer barrel includes a second ring-shaped part thereof. The first ring-shaped part is coupled to the second ring-shaped part.

An exemplary method for making a camera device including the steps of: providing a half-finished camera device, the half-finished camera device including a holder, an image sensor, an outer barrel with an axis, and an inner barrel unit, the image sensor being disposed in the holder, the inner barrel unit including an inner barrel and at least one lens disposed in the inner barrel, the at least one lens of the inner barrel unit is configured for forming an image, the image comprising a defective image, the inner barrel being threadedly received in the outer barrel, wherein the outer barrel is rotatably coupled to the holder;

rotating the outer barrel and the inner barrel unit together relative to the holder in a manner such that the defective area is outside a detecting area of the image sensor; securing the outer barrel to the holder.

BRIEF DESCRIPTION OF THE DRAWINGS

Many aspects of embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE EMBODIMENTS

Embodiments will now be described in detail below with reference to the drawings.

Figure 1:
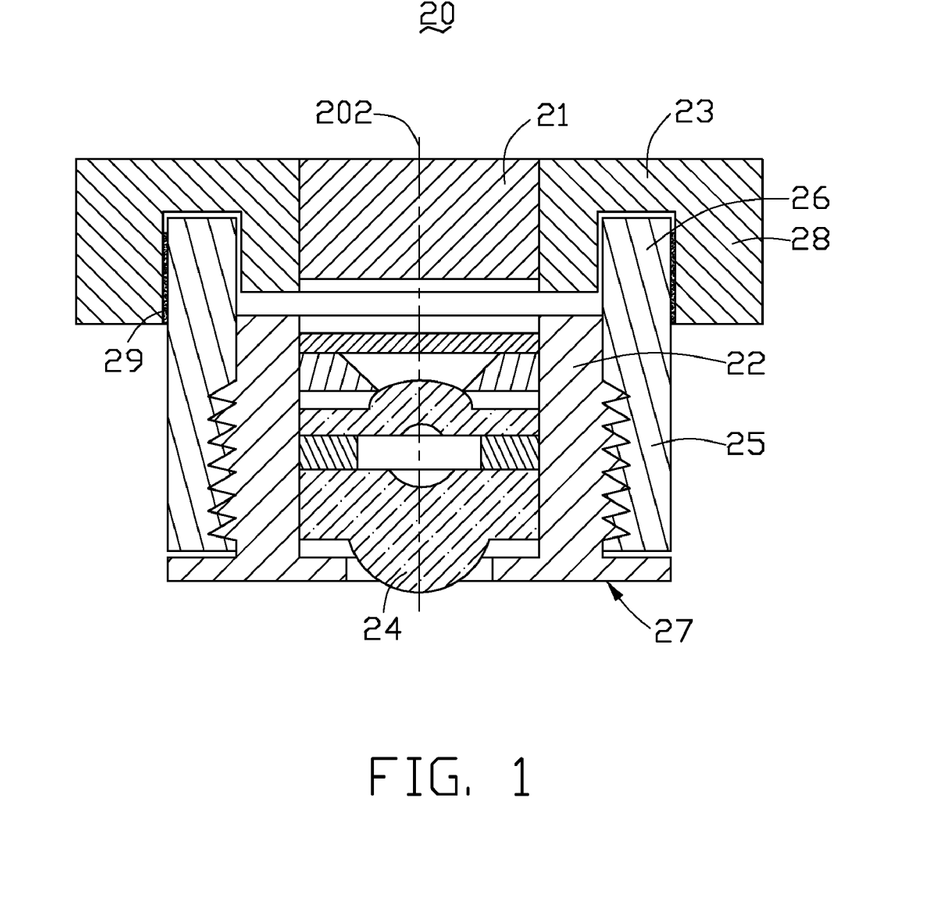
FIG. 1 is a schematic, side cross-sectional view of a camera device according to a first embodiment.

Referring to FIG. 1, a camera device 20 of a first embodiment is shown. The camera device 20 includes an image sensor 21, a holder 23, an outer barrel 25 with an axis 202, and an inner barrel unit 27. The image sensor 21 is fixed in the holder 23. The inner barrel unit 27 includes an inner barrel 22 and at least one lens 24 disposed in the inner barrel 22. The inner barrel 22 is threadedly coupled to the outer barrel 25. The outer barrel 25 includes a first ring-shaped part 26 at one end thereof, and the holder 23 includes a second ring-shaped part 28. The outer barrel 25 is fixed to the holder 23 using an adhesive 29. The adhesive 29 can be, for example, glue. Alternatively, the outer barrel 25 can be fixed to the holder 23 by using other means, for example, using screws. The outer barrel 25 is rotatably coupled to the holder 23 using the first ring-shaped part 26 and the second ring-shaped part 28 before the outer barrel 25 is fixed to the holder 23 so that the outer barrel 25 is capable of rotating around the axis 202 thereof relative to the holder 23.

Figure 2:
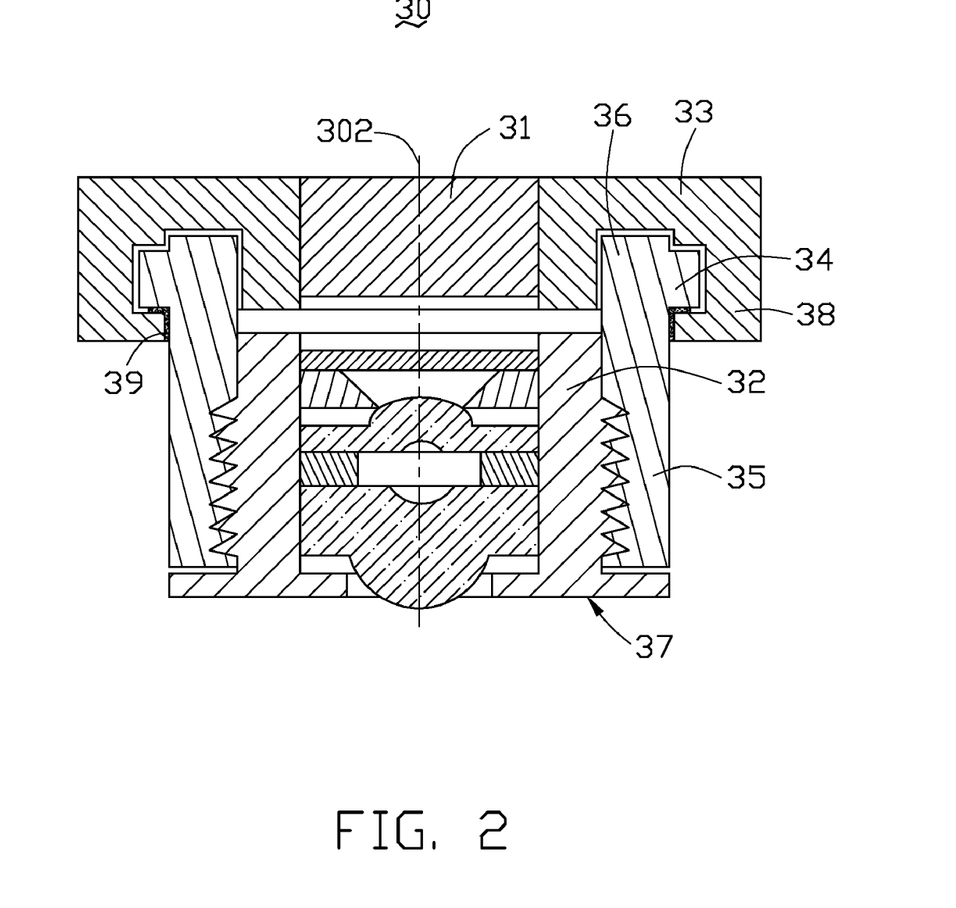
FIG. 2 is a schematic, side cross-sectional view of a camera device according to a second embodiment.

Referring to FIG. 2, a camera device 30 of a second embodiment is shown. The camera device 30 is similar to the camera device 20. However, the first ring-shaped part 36 includes a protrusion structure 34 on peripheral portion thereof. The second ring-shaped part 38 includes a recess structure (not labeled) corresponding to the protrusion structure 34.

Figure 3:
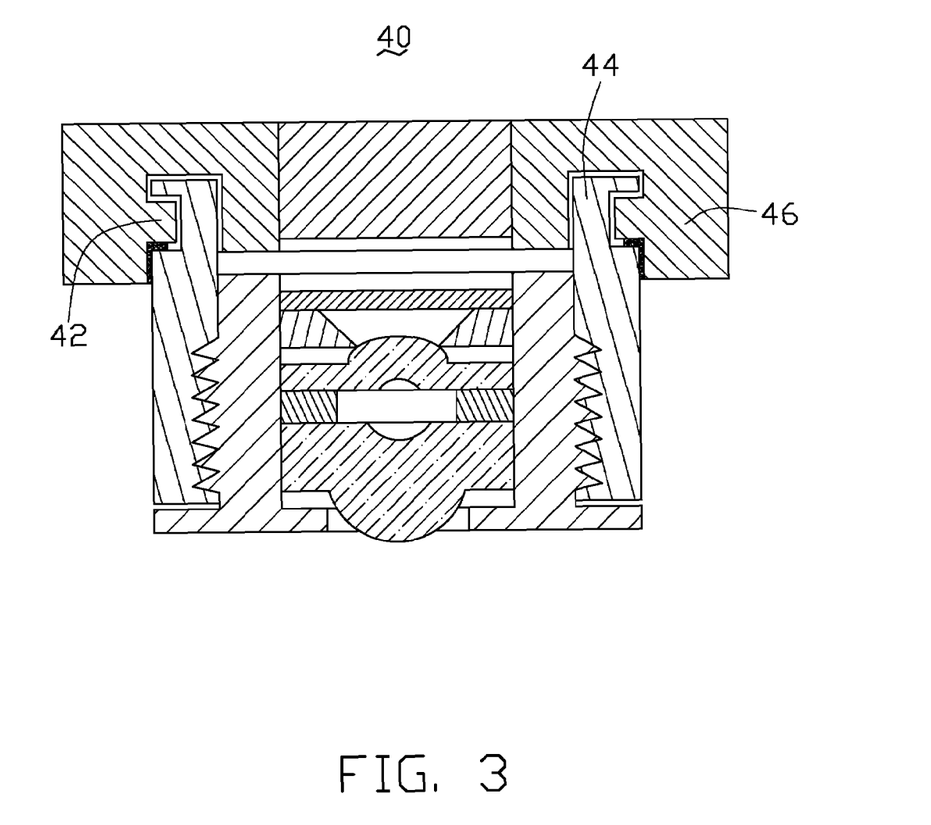
FIG. 3 is a schematic, side cross-sectional view of a camera device according to a third embodiment.

Referring to FIG. 3, a camera device 40 of a third embodiment is shown. The camera device 40 is similar to the camera device 20. However, the first ring-shaped part 44 includes a recess structure (not labeled) thereof. The second ring-shaped part 46 includes a protrusion structure 42 corresponding to the protrusion structure 42 on peripheral portion thereof.

Figure 4:
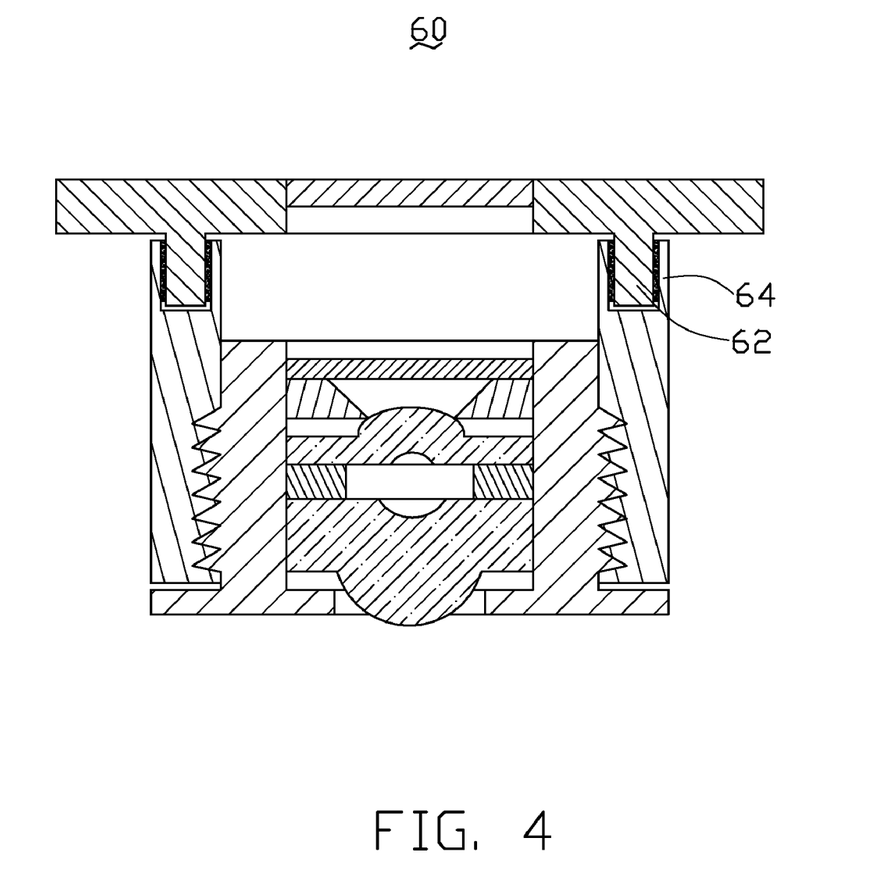
FIG. 4 is a schematic, side cross-sectional view of a camera device according to a fourth embodiment.

Referring to FIG. 4, a camera device 60 of a fourth embodiment is shown. The camera device 60 is similar to the camera device 20. However, part of the second ring-shaped part 62 is received in the first ring-shaped part 64.

Figure 5:
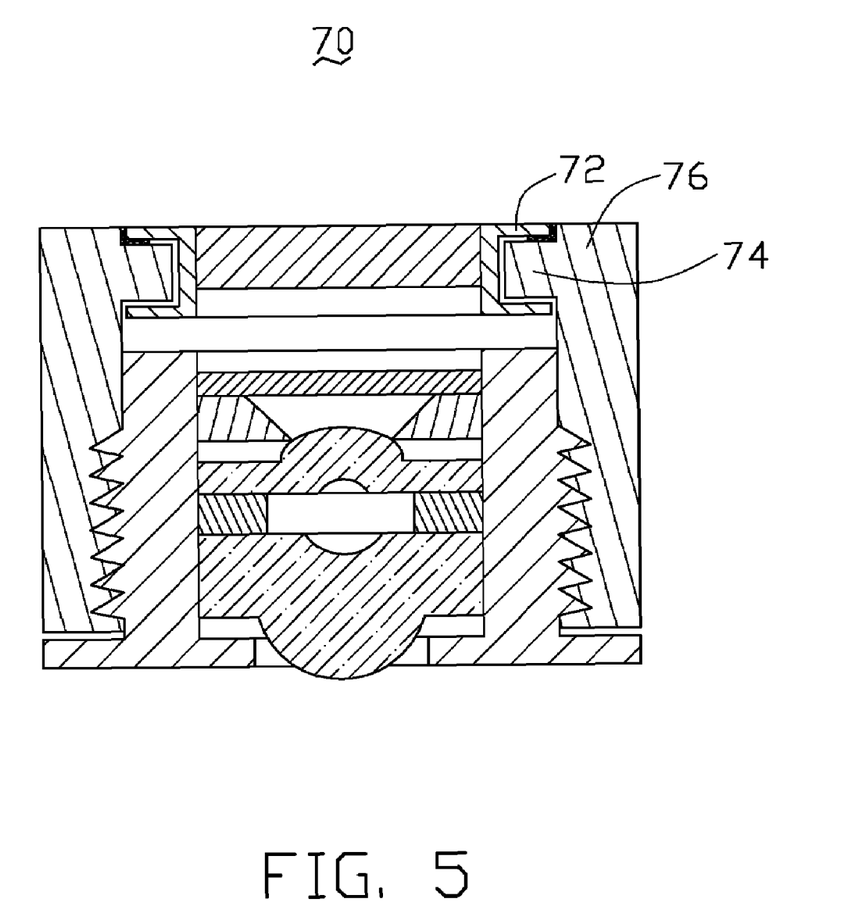
FIG. 5 is a schematic, side cross-sectional view of a camera device according to a fifth embodiment.

Referring to FIG. 5, a camera device 70 of a fifth embodiment is shown. The camera device 70 is similar to the camera device 20. However, the first ring-shaped part 76 includes a protrusion structure 74 on peripheral portion thereof. The second ring-shaped part 72 includes a recess structure (not labeled) corresponding to the protrusion structure 74 thereof.

Figure 6:
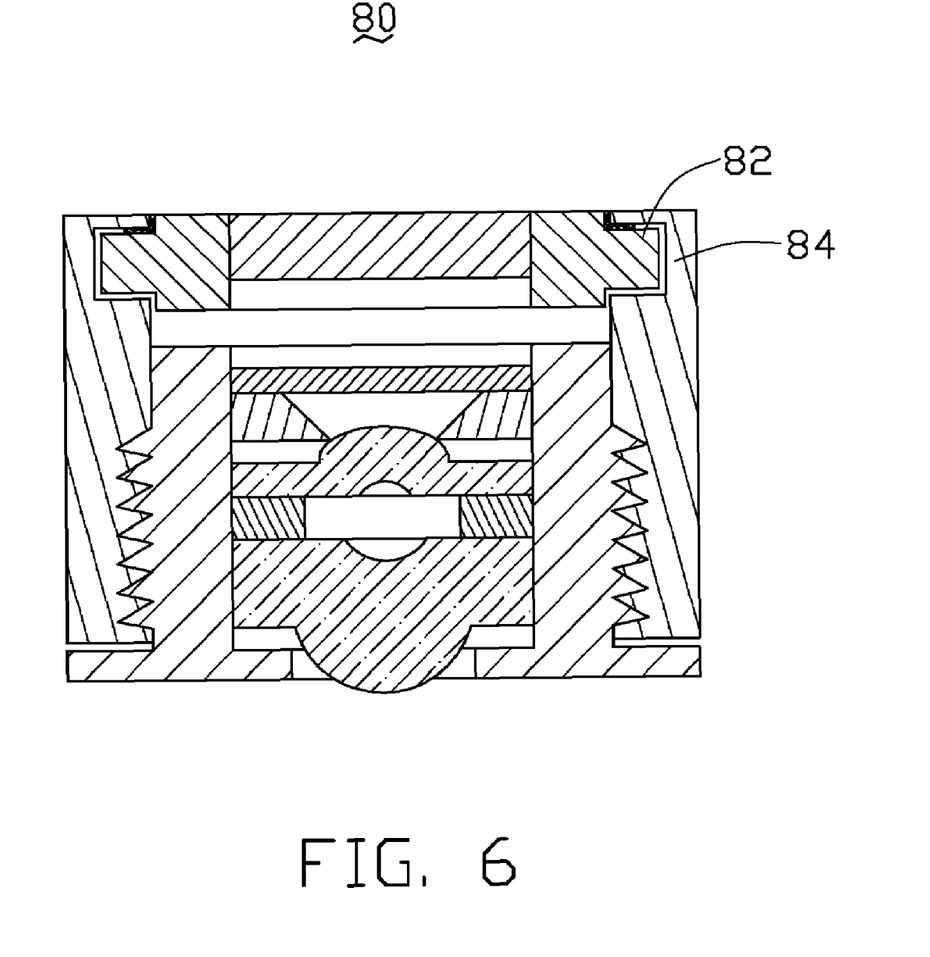
FIG. 6 is a schematic, side cross-sectional view of a camera device according to a sixth embodiment.

Referring to FIG. 6, a camera device 80 of a sixth embodiment is shown. The camera device 80 is similar to the camera device 20. However, part of the second ring-shaped part 82 is received in the first ring-shaped part 84.

With reference to FIG. 2 and FIGS. 7 to 9, a method for making the camera device 30 is described in more detail.

Figure 7:
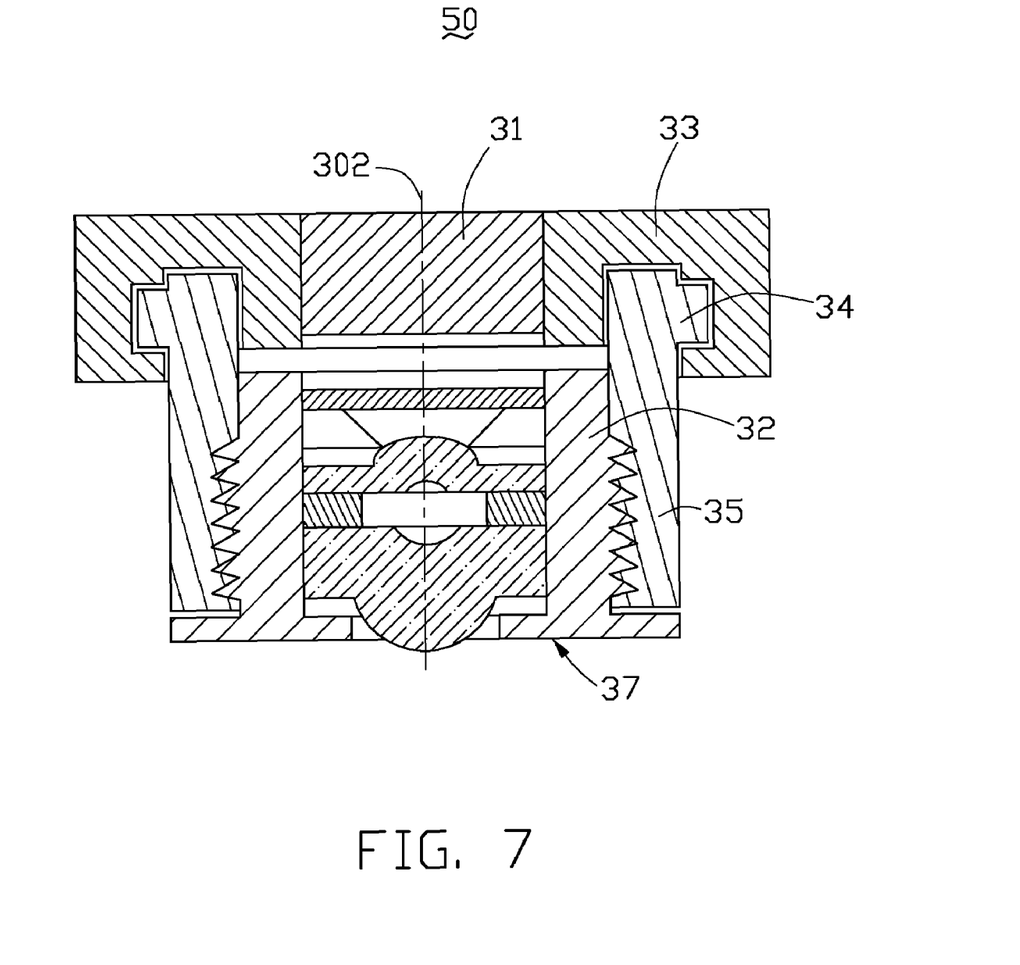
FIG. 7 is a schematic, side cross-sectional view of a half-finished camera device.

In step 1, a half-finished camera device 50 is provided, referring to FIG. 7. The camera device 50 is similar to the camera device 30 of FIG. 2, but the outer barrel 35 is not fixed to the holder 33 thus allowing the outer barrel 35 to rotate around an axis 302 thereof. The inner barrel unit 37 is configured for forming an image 61, and the image 61 includes a defective image area 63, as seen in FIG. 8.

In step 2, a distance between the image sensor 31 and the inner barrel unit 37 is adjusted by rotating the inner barrel unit 37 relative to the outer barrel 35, thus achieving the best imaging quality for the camera device 50.

Figure 8:
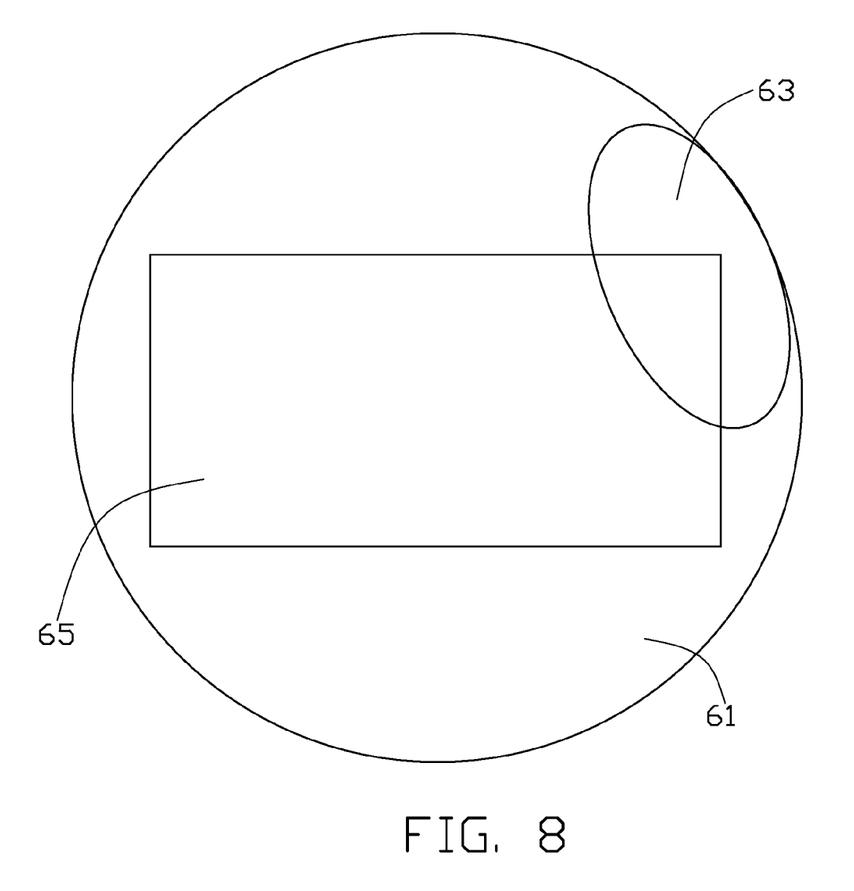
FIG. 8 is a schematic, plan view of an imaging state of the half-finished camera device of FIG. 7.
Figure 9:
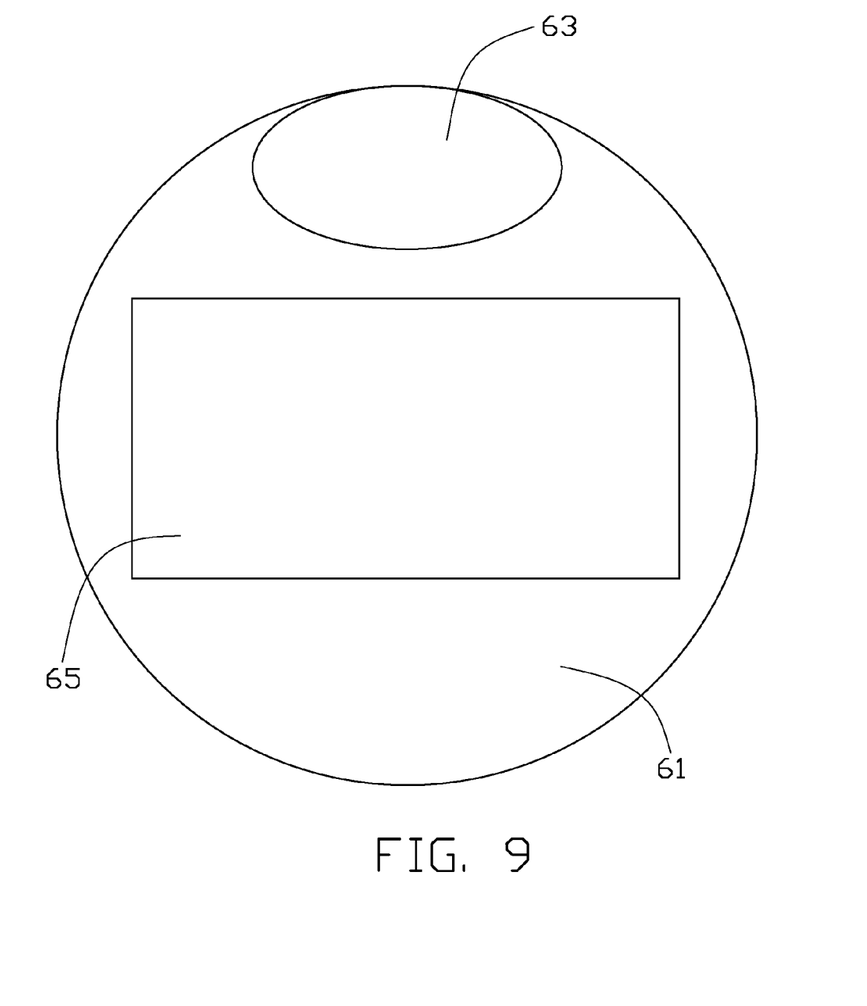
FIG. 9 is a schematic, plan view of an imaging state after adjusting the half-finished camera device of FIG. 7.

In step 3, checking is operated on an image area 61 of the camera device 50 so as to check whether the defective image area 63 overlaps a detecting area 65 of the image sensor 31, referring to FIG. 8. When the defective image area 63 overlaps a detecting area 65, the outer barrel 35 and the inner barrel unit 37 are together rotated around the axis 302 relative to the holder 33 in such a manner that the defective image area 63 is outside the detecting area 65, referring to FIGS. 7 and 9.

In step 4, the outer barrel 35 and the holder 33 are fixed together using an adhesive 39, thus forming the camera device 30 of FIG. 2.

It should be noted that the other camera devices of the present embodiments can also be made using methods similar to the above method.

In each of the present camera devices, the outer barrel is rotatably coupled to the holder so that the outer barrel is capable of rotating around the axis thereof relative to the holder before they are fixed together with each other. In such a manner, the defective image area of the inner barrel unit can be moved outside the detection area of the image sensor by rotating the outer barrel relative to the holder. In this way the imaging quality of the camera device is enhanced, and then a yield rate of the camera device is increased. The camera device made using the above method has the same advantages.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A camera device, comprising:
   a holder comprising a first ring-shaped part;
   an image sensor disposed in the holder;
   an outer barrel, the outer barrel comprising a second ring-shaped part, wherein the first ring-shaped part is rotatably coupled to the second ring-shaped part; and
   an inner barrel unit comprising an inner barrel and at least one lens disposed in the inner barrel, the inner barrel being threadedly coupled to the outer barrel, wherein the second ring-shaped part is received in the first ring-shaped part, the second ring-shaped part comprises a protrusion structure on a peripheral portion thereof and the first ring-shaped part comprises a corresponding recess structure receiving the protrusion structure therein.

2. A camera device, comprising:
   a holder comprising a first ring-shaped part, the first ring-shaped part comprising a protrusion structure;
   an image sensor disposed in the holder;
   an outer barrel, the outer barrel comprising a second ring-shaped part, the second ring-shaped part comprising a recess structure corresponding to and receiving the protrusion structure therein, wherein the first ring-shaped part is rotatably coupled to the second ring-shaped part; and
   an inner barrel unit comprising an inner barrel and at least one lens disposed in the inner barrel, the inner barrel being threadedly coupled to the outer barrel.

* * * * *